United States Patent

Lipkin

[15] 3,706,463
[45] Dec. 19, 1972

[54] INFLATABLE SAFETY BALLOON WITH INERTIAL MEANS OF ACTUATION

[72] Inventor: Martin Lipkin, 445 East 86th Street, New York, N.Y. 10028

[22] Filed: Feb. 24, 1970

[21] Appl. No.: 13,270

[52] U.S. Cl. .................280/150 AB, 137/38, 222/5, 244/122 B
[51] Int. Cl. ...........................................B60r 21/08
[58] Field of Search.......280/150 AB, 150 B, 150 SB; 180/90; 244/122; 137/38, 68; 222/3, 5; 73/488; 116/114 AH; 9/316

[56] References Cited

UNITED STATES PATENTS

| 3,020,874 | 2/1962 | Bruce et al. | 116/114 AH |
|---|---|---|---|
| 3,083,035 | 3/1963 | Ottosson | 297/389 X |
| 3,243,822 | 4/1966 | Lipkin | 280/150 |
| 3,430,979 | 3/1969 | Terry et al. | 280/150 |
| 2,649,311 | 8/1953 | Hetrick | 180/90 |
| 3,414,322 | 12/1968 | Linderoth | 297/389 |
| 3,418,007 | 12/1968 | Jantzen | 280/150 |
| 3,197,234 | 7/1965 | Bertrand | 280/150 |
| 3,414,292 | 12/1968 | Oldberg et al. | 280/150 |

FOREIGN PATENTS OR APPLICATIONS

| 1,431,098 | 1/1966 | France | 280/150 |

Primary Examiner—Kenneth H. Betts
Attorney—Fidelman, Wolffe & Leitner

[57] ABSTRACT

An inflatable safety balloon made of a flexible material is folded and mounted within a compartment on an elastic attachment cord which is mounted inside of a car in a manner resembling a shoulder harness so as to position the compartment in front of a wearer's chest. A gas release mechanism and a source of pressurized gas which inflates the balloon in an area between a wearer's chest and the dashboard or front seat when activated. The gas release mechanism may be inertially activated or manually activated.

25 Claims, 9 Drawing Figures

PATENTED DEC 19 1972 3,706,463

INVENTOR.
MARTIN LIPKIN
BY
ATTORNEYS

INFLATABLE SAFETY BALLOON WITH INERTIAL MEANS OF ACTUATION

This invention relates to an inflatable safety balloon that can be positioned in front of the chest and head for preventing serious injury to the wearer in a vehicle collision, and means whereby this balloon can reliably and with safety be caused to inflate nearly instantaneously and automatically upon the initiation of a collision, and means whereby inflation of the balloon at inappropriate times can be avoided. An objective of the invention is to provide maximum convenience to the wearer to facilitate the prompt and correct use of the invention.

In the present age of public and private transportation, injuries to drivers or passengers, consequent upon collisions involving vehicles, constitute one of our principal public health problems. The failure to solve this problem can be traced beyond the initial reluctance of vehicle designers to incorporate seat belts or lap belts in their designs, and beyond the failure of the general public to adequately use such belts, to the fact that this conventional means of protection is not by itself sufficient to prevent serious injury in many cases, even where it is used. Increased protection for the upper torso and head has been made possible by the use of the shoulder harness as an adjunct to the lap belt. However, the additional curtailment of freedom of movement which this entails may not only be a nuisance, but in some cases may actually be a detriment to safety, as in the extreme case where the driver of an automobile may be prevented from reaching certain controls.

Another approach to increased collision safety, which has been under theoretical consideration for some time is the use of inflatable balloons to cushion against decelerative forces. In the special case of automobiles, this approach is useful only if the balloons can be arranged to inflate in extremely short times after the onset of a collision, without the intervention of the persons to be protected. A current design envisages having the balloon expand towards the person; this would involve having the surface of the balloon cover the distance of as much as two feet to the person in perhaps forty thousandths of a second, implying a velocity of impact which would be a substantial fraction of the speed of a thrown baseball. The present invention seeks to avoid such a questionable situation by having the balloon expand away from the person.

In the special case of application of safety ballons to passengers in aircraft, where rapid, automatic inflation of the balloons may only rarely be a consideration, and where it may be desirable to have inflation of the balloons under the central control of the pilot, a different problem arises. Inflation of a particular balloon may in special circumstances be undesirable. An important example would be a situation where a passenger happened to be out of his seat at the instant that the pilot elected to inflate balloons in anticipation of loss of control of the aircraft. If the balloon located at that passenger's seat is then inflated, it could seriously jeopardize his chances of regaining his seat and the protection that it and the balloon might offer. Thus, what would be desirable would be to have the balloon's inflation be conditional upon some action of the passenger as well as upon the action of the pilot; thereby, the balloon would be prepared to inflate by the action of the pilot, but would actually inflate only when the passenger had completed some additional action that required his presence in the seat. It is a purpose of the present invention to describe means for accomplishing such a conditional control of inflation, in a manner that is unique where the aforesaid object of having the balloon expand away from the person is realized. For, since the object of having the balloon expand away from the person can only be accomplished if the balloon, in its uninflated state, is positioned close to the person, achieving that position requires an initial action whereby the uninflated balloon is brought into place, e.g., by attaching a strap which suspends the balloon in front of the person; and, such action of bringing into place, or positioning, or fastening as of straps provides the opportunity of exercising means for accomplishing the necessary conditional control. Accordingly, it is an object of the present invention to provide means whereby the inflation of a safety balloon can be postponed, or even prevented altogether. It can be noted that a desirability of preventing inflation altogether, exists even in the case of automobiles, where the accidental inflation of one of the safety balloons could inflict bodily injury to a mechanic engaged in the repair of the automobile, or to some other person in an inopportune position inside the vehicle.

Inasmuch as the acceptance of safety means by the person to be protected may be an important factor in securing his effective use of those means, the present invention of safety means has several important intangible objectives which can be enumerated as follows. First, to provide maximum convenience in any actions required of the person to be protected; second, to provide maximum comfort of the safety means — this is accomplished in the present invention by having the safety balloon, when uninflated, positioned loosely in front of the person's chest, and positioned there by a rather elastic suspension, in contrast to the inelastic and constricting shoulder harnesses which the present invention in essence is capable of replacing; third, to encourage individual responsibility for the proper maintenance of the safety means, by making it possible, in some vehicular applications, for an individual to supply his own safety balloon system, including at least the balloon, its inflating hose and its supporting strap and necessary fittings, and possibly even the gas supply reservoir. This objective, which is the antithesis of the philosophy of impersonal, communal supply of safety means, of reliance upon unknown maintenance personnel, may be applicable to many people who wish to be responsible for their own safety, who can be educated in safety, and is consistent with the proper role of individual initiative in a modern society; fourth, and far from academic, is the objective of providing safety means which are not so objectionable to the popular mind that they would stand in hazard of being intentionally destroyed by some persons who have reason to fear them, or, of being disconnected or inactivated.

It is an object of this invention to overcome all of the above enumerated disadvantages of prior systems by providing an improved inflatable vehicle safety device.

It is a further object of this invention to provide an inflatable safety balloon to be located adjacent the chest of a vehicle occupant in its uninflated state.

It is a still further object of the present invention to provide an inflatable safety balloon which is inflated by an inertially actuated gas mechanism.

It is another object of the present invention to provide an inflatable vehicle occupant safety balloon which expands away from the occupant when it is activated instead of towards him.

A further object of the present invention is to provide convenience of application of the safety balloon so that whatever actions are required of the occupant to secure the device or permit its use are minimized and made most simple.

These and other objects of this invention will become more apparent as well as the nature and mode of operation of the present invention wherein reference is made to the accompanying drawings, wherein:

FIG. 3 is a side view of the inertial gas release mechanism showing parts broken away for clarity;

Figure 1:
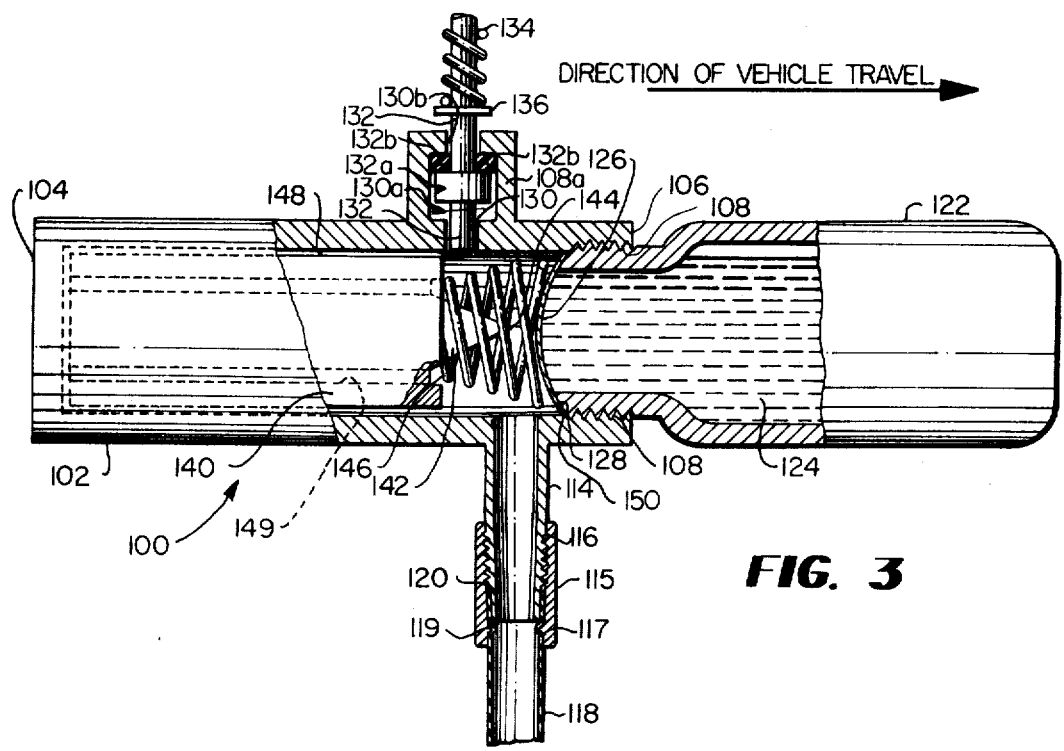
FIG. 1 is a side view of a vehicle broken away to show a right-seat occupant therein with the balloon of the present invention in place showing the stages of inflation in phantom lines.

Referring now to FIG. 1 there is shown a vehicle 10 having a dashboard 12, a windshield 14, a floorboard 16 and a front seat 18. Seat 18 has a back support section 20.

Mounted underneath seat 18 is an inertial gas release mechanism 21. An elastic shoulder harness consists of a strap section 13 and a strap section 17 connected together by buckle 25. Section 17 is fastened to the vehicle floor at 19 by any suitable means and section 13 is connected to the vehicle door post or roof at 15 by any suitable means.

A hose 23 is connected at one end to gas release mechanism 21 and is attached to strap sections 13 and 17 in any suitable manner. Hose 23 has a coupling fitting which forms an integral part of strap buckle 25, so that hose coupling is accomplished where strap sections 13 and 17 are fastened together by buckle 25.

The other end of hose 23 connects to a folded balloon 11 which is either fixedly attached to strap section 13 or slidably attached thereto.

Shown in phantom lines are the various stages of inflation of balloon 11. Thus, 30 represents the shape of the balloon upon first being distended by the in rushing gas from mechanism 21. Lines 31, 32 and 33 represent successive inflating stages, and 34 represents the final inflation stage.

A valve 24, such as a spring-loaded popout valve, limits the pressure rise in the balloon.

Figure 2:
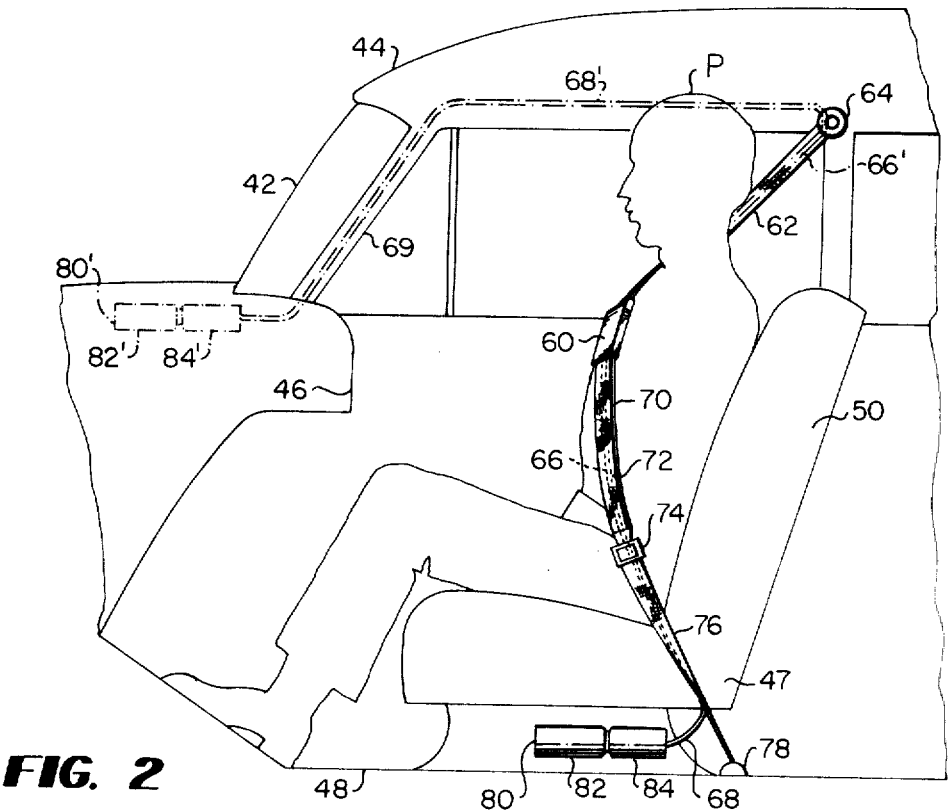
FIG. 2 is a view similar to FIG. 1 but showing the inflatable balloon before actuation and the alternate locations of the gas release mechanism.

FIG. 2 shows an arrangement similar to that shown in FIG. 1. A vehicle 44 is shown as having a windshield 42, a dashboard 46, a floor 48 and a seat 47 with a back support section 50. An occupant P is shown sitting in seat 47. An elastic harness 70 is shown as having upper section 62 and intermediate section 72 coupled to a lower section 76 by buckle 74. Lower section 76 is attached to floor 48 at 78 by any suitable means and section 62 is attached to the door post or roof of vehicle 44 at 64 by any suitable means. A gas release mechanism 80, consisting of inertial weight portion 84 and gas storage portion 82, is connected to a hose 68. Hose 68 is attached to section 76 by any suitable means and is adapted to be connected to ahose 66 in section 72 by a coupling forming a part of buckle 74. Hose 66 is, in turn, connected to the folded balloon pack 60 which is either fixedly or slidably attached to harness 70.

As an alternative location, a gas release mechanism 80' may be placed behind the dashboard 46 and connected to a hose 68' which runs up through a corner post 69, through the vehicle roof and is connected by any suitable means at 64 to hose 66' located in harness section 62.

FIG. 3 shows an inertial gas release mechanism 100. Generally, it consists of a pressure-tight cylindrical housing (it need not be cylindrical) 102 which has an end portion 104. A massive inertial weight 140 resides within housing 102 and is of slightly smaller size so as to allow a space 148 to exist between housing 102 and the weight. Lubricant is placed in space 148 to facilitate inertial movement of the weight. A plurality of horizontally extending pressure equalizing channels extend through weight 140. Pressure equalizing channels 149 extend through weight 140 and serve to prevent the puncturing weight from being forcibly slammed backwards against end portion 104 by the gas escaping from a gas storage bottle 122.

The end 106 of housing 102 is internally threaded as at 108 to receive the threaded neck of a gas storage bottle 122. The gas within storage bottle 122 may be in the liquid phase as at 124. The top of the neck portion of bottle 122 is curved to engage a thin pressure release diaphragm 126 which is permanently attached thereto in any suitable fashion, such as by a weld 150. A biasing coil spring 146 abuts weight 140 and holds the weight in its resting position. A tapered puncturing projection 142 extends forward within spring 146 and terminates in a puncturing point 144.

An interlock safety pin 132 extends through an opening 130 in housing 102. A flange 136 is secured on pin 132 and allows a spring 134 to force the pin down and in front of the forward edge of weight 140 to prevent any undesired or accidental movement of the weight.

A portion 108A of housing 102 encloses a region 130A in which an increased diameter portion 132A of pin 132 moves. Region 130A is in communication with opening 130. Pin 132 extends through the top of portion 108A via opening 130B. Openings 130B and 130 permit pin 132, including portion 132A to move freely in and out of locking position with respect to piston 140. A compression packing washer 132B effects a seal that isolates external opening 130B from the interior region 130A when diaphragm 126 is ruptured and gas is released. Thus, gas leakage is prevented.

The pin 132 can be attached to an elastic cord, the elastic harness or the like, which is stressed when the occupant attaches it to its roofline mooring in the act of positioning the balloon in front of his chest, so that the pin is withdrawn sufficiently, despite spring 134 to allow the weight 140 to force point 144 through diaphragm 126 upon deceleration accompanying collision.

A nipple 114 extends downwardly from the inside of housing 102 and is threaded as at 116. A hose 118 is received on the end of the nipple and an internally threaded sleeve 115, having a projection 117, secures the hose to the nipple. The end of the hose is spread as at 120 and a portion 119 is forced annularly inward to insure a tight and secure fit. This is described merely for purposes of illustration and does not form part of the present invention.

Upon deceleration accompanying collision, provided that pin 132 has previously been withdrawn from housing 102, the point 144 punctures diaphragm 126 and the gas is released and escapes through nipple 114, hose 118 and ultimately inflates the safety balloon.

Figure 4:
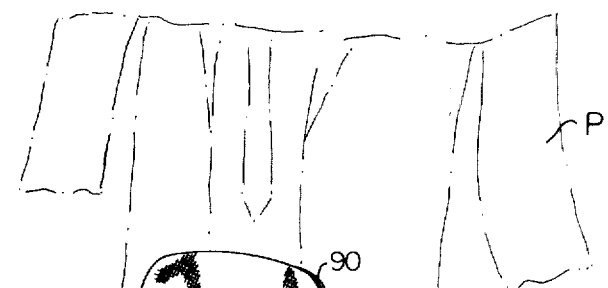
FIG. 4 is a view of an alternate embodiment of the present invention.

Referring now to FIG. 4, there is shown an alternate embodiment of the invention. In this embodiment a folded balloon pack 90 is secured as by stitching 94 or the like to a seat belt strap section 92. Section 92 is coupled to section 98 through buckle 96. A hose 95 extends from balloon 90 along section 92 through section attachment 97 and then to a gas release mechanism (not shown).

While this embodiment works satisfactorily, it is not preferred since the location of the balloon pack 90 does not insure the proper positioning of the balloon in front of the occupant as the other embodiment does.

The instant safety balloon, in essence, replaces the shoulder harness but continues to be augmented by the lap or seat belt. The folded balloon, and its elastic attachment straps, fit loosely in front of the occupant and permit greater freedom of movement (e.g., leaning forward) than a conventional shoulder harness.

The inflating hose is normally flat in shape and only assumes a round shape when gas pressure is applied.

When the balloon unit is not being used, expansion is prevented from occurring by the interlock pin which is not removed until the elastic cord or strap is slightly stressed. It is noted that the mere weight of the balloon pack provides sufficient force, when the balloon is suspended by the elastic cord or strap, to actuate the removal of the safety pin. In the absence of stress in the elastic strap, the return spring reinserts the interlock pin.

An alternate version of the invention involves the addition of a balloon unit to a conventional shoulder harness, with the hose feeding downwards from above the window, and being supplied by a hose that communicates, through the interior of the front roof strut, with a gas release mechanism located on the engine firewall. The folded balloon would slide adjustably onto the shoulder strap. Therefore, a conventional single point attachment for both the lap belt and shoulder harness could continue to be used. In such a version, the actuation of the release of the interlock pin is accomplished by the action of connecting the single buckle.

A further alternate version also uses the usual combination of lap belt and shoulder harness with the folded balloon again fitted (sliding adjustably) onto the shoulder strap but having the gas release mechanism under the front seat.

A still further and preferred version uses an elastic cord attached to the balloon pack and adapted to be connected to a quick-disconnect coupling means located on the car just above the window next to the occupant. A nylon reinforced inflating hose connects the balloon pack with the self-contained inflating unit, consisting of a gas storage cylinder and an inertial gas release means. The hose is fed up through the crack between the seat cushion and seat back.

Figure 5:
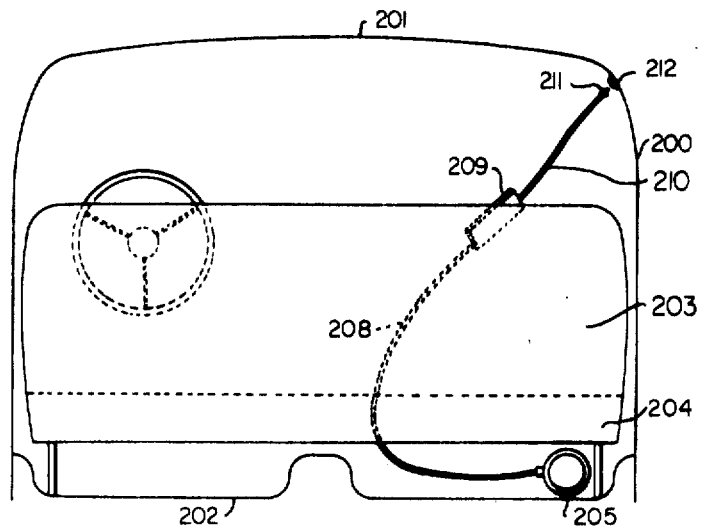
FIG. 5 is a rear view of the front compartment of a vehicle broken away showing the relative location of the balloon and attaching cord.
Figure 6:
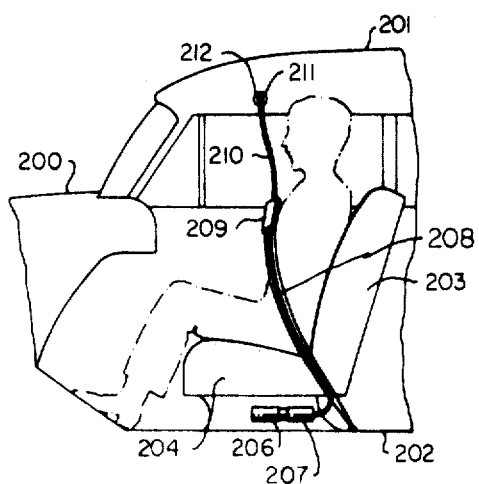
FIG. 6 is a side view of the front compartment of a vehicle broken away showing an alternate location for the point of attachment of the balloon mounting strap.
Figure 7:
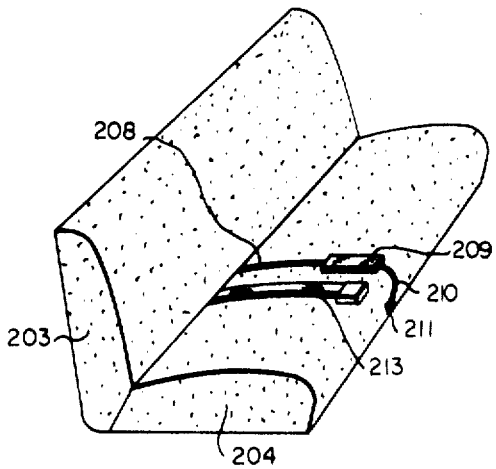
FIG. 7 is a perspective view of a seat of a vehicle showing the arrangement of FIG. 6 in folded condition.

The preferred embodiment is shown generally in FIGS. 5–7. In FIG. 5 there is shown a vehicle body 200 having a roof 201, a floor pan 202, and a seat 203 (a front seat is illustrated but the description applies equally as well to a rear seat) having a bottom 204. A self-contained inflating unit 205, comprising a gas storage cylinder 206 and completely inertial gas release means 207 (as shown in FIG. 6), is located underneath the seat bottom and is attached to the floor or seat structure in any suitable fashion. A reinforced inflating hose 208 connects the inflating unit 205 with a small packet 209 which consists of a deflated and folded balloon. The hose 208 extends horizontally from unit 205 a distance (as shown in FIG. 5) and then is fed up through the seat crack, the reason for the horizontal run of hose being to allow for front-back adjustability of the seat.

An elastic cord 210 extends from packet 209 and has a quick-disconnect coupling means 211 on the end thereof adapted to cooperate with coupling means 212 located at the vehicle roof line just above the window. Connecting means 211 to means 212 positions the balloon pack adjacent the chest of a wearer and arms the self-contained inflating unit 205.

FIG. 7 shows the hose 208, the packet 209 and the elastic attaching cord 210 in position on the seat. A conventional lap belt may be used in conjunction with the balloon and is shown designated as 213. The hose 208 is in a flattened condition prior to actuation of the device.

In all of these embodiments, the ordinary deceleration of the vehicle, usually less than 1g, is not sufficient to offset the action of the biasing spring keeping the inertial weight from sliding in its bore. At decelerations of from 2 to 3g, the spring will start to compress; and, at 4 to 5g the inertial weight (as much as 10 lbs. of iron or brass) develops sufficient forward force not only to compress the spring but also to puncture the diaphragm and release the gas to fill the balloon. The foregoing numbers are meant only to be illustrative; puncturing of the diaphragm may also be aided by increasing the travel of the puncturing point before contact, to enable the driving weight to develop increased momentum.

Figure 8:
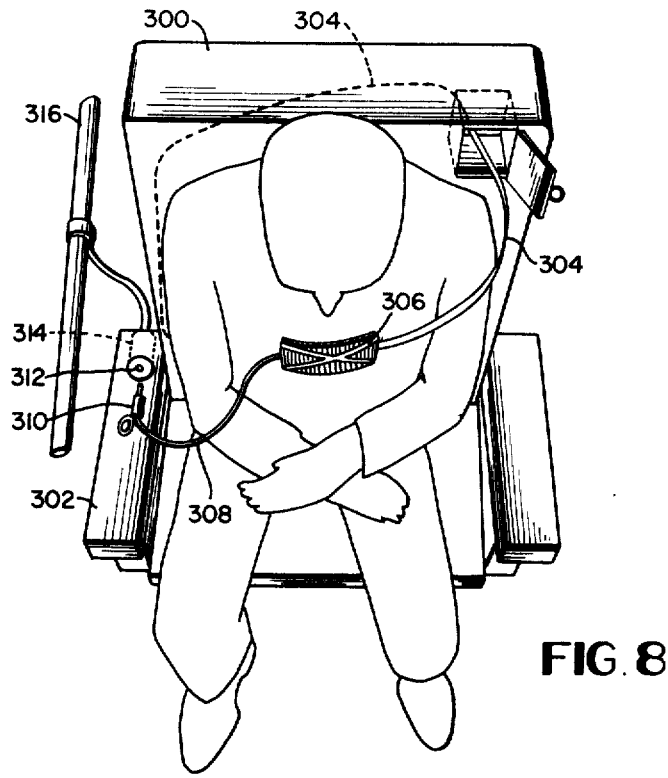
FIGS. 8 and 9 are perspective views of two embodiments of the present invention for use in an airplane.
Figure 9:
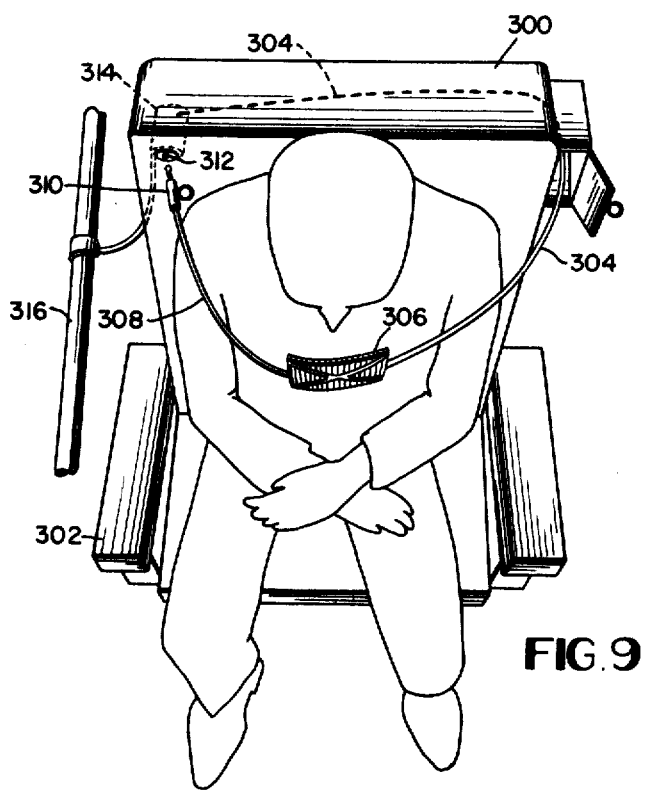

The instant device is also adaptable to aircraft use as shown in FIGS. 8 and 9. The apparatus is mounted in an inconspicuous place such as the arm rest 302, seat back 300, etc. A flattened inflating hose 304 is attached to the unit and connects to the balloon pack 306. An elastic cord extends from the balloon pack and has a keyed plug 310 on the extremity thereof adapted to be inserted into a small aperture 312 in either the seat back 300 or arm rest 302, which holds a valve 314. The valve 304 connects with the main pressure line 316 or source and the inflating hose 304. Thus, until the keyed plug 310 is inserted into the valve aperture 312 to actuate it, the device cannot be actuated. The inflating hose 304 and elastic cord 308 are of a length enabling the balloon pack 306 to be positioned adjacent the chest of a wearer or passenger.

The pressure source may either be an individual pressure bottle associated with each seat or a common gas line that can be pressurized at the initiative of the pilot.

While a preferred embodiment and other embodiments have been shown and described and others have been only described, it will be apparent to those skilled in the art upon reading this disclosure, that various changes and modifications can be made without departing from the scope of this invention.

What is claimed is:

1. A system for preventing injuries to the occupants of a vehicle upon severe deceleration thereof, said system consisting of an inflatable balloon pack, an inflating hose connected to said pack, a pneumatic pressure means remote from said pack and connected to the other end of said inflating hose for inflating said balloon upon severe deceleration of said vehicle once armed, and balloon support means attachable to said vehicle at at least two points for positioning said balloon pack across the chest of an occupant of said vehicle, said pneumatic pressure means being armed by placing said balloon support means across the chest of said occupant.

2. A system as in claim 1 wherein said pneumatic pressure means comprises an inertial weight means and a gas storage means, said inertial weight means adapted to effect the release of gas from said gas storage means upon severe deceleration of said vehicle to inflate said balloon.

3. A system as in claim 2 wherein said gas storage means is sealed by a rupturable diaphragm and said inertial weight means is adapted to slide and puncture said diaphragm upon severe deceleration.

4. A system as in claim 3 wherein said inertial weight is normally biased against movement by a spring, said biasing being of a force sufficient to prevent sliding movement of said weight upon ordinary vehicle deceleration but not sufficient to prevent such movement upon severe deceleration.

5. A system as in claim 2 wherein a safety pin is provided to prevent said inertial weight means from accidentally or when undesired effecting release of said gas means, said pin connected to said balloon support means so that attachment of said support means arms said pneumatic pressure means.

6. A system as in claim 1 wherein said pneumatic means is adapted to be positioned on the floorpan or seat of said vehicle.

7. A system as in claim 1 wherein said pneumatic means is adapted to be positioned on the firewall of said vehicle.

8. A system as in claim 1 wherein said balloon support means is an elastic strap at least one end of which is adapted to be attached to the top or side of the inside of the vehicle.

9. A system as in claim 8 wherein said pneumatic pressure means comprises an inertial weight means and a gas storage means, said inertial weight means adapted to effect the release of gas from said gas storage means upon severe deceleration of said vehicle to inflate said balloon, a safety pin means normally biased into a position to prevent said inertial weight means from effecting release of said gas, said pin means being operatively connected to said elastic strap means so that attachment of said elastic strap means arms said pneumatic pressure means by repositioning said pin means.

10. A system as in claim 8 wherein said balloon pack is slidably mounted on said elastic strap means.

11. A system as in claim 1 wherein said balloon support means is a nonelastic shoulder harness and is adapted to be attached to the top or side of the inside of a vehicle and the other end is adapted to be secured to a lap belt.

12. A system as in claim 11 wherein said pneumatic pressure means comprises an inertial weight means and a gas storage means, said inertial weight means adapted to effect the release of gas from said storage means upon severe deceleration of said vehicle to inflate said balloon, a safety pin means normally biased into a position to prevent said inertial weight means from effecting release of said gas, said pin means being operatively connected to said balloon pack so that deployment of said balloon pack arms said pneumatic pressure means by repositioning said pin means.

13. A system as in claim 11 wherein said balloon pack is slidably mounted on said shoulder harness.

14. A system as in claim 1 wherein said balloon support means comprises a two section elastic strap means connected together by a buckle, the other ends of said strap means being adapted to be attached to the top and bottom of the inside structure of said vehicle respectively.

15. A system as in claim 14 wherein said pneumatic pressure means comprises an inertial weight means and a gas storage means, said inertial weight means adapted to effect the release of gas from said gas storage means upon severe deceleration of said vehicle to inflate said balloon, a safety pin means normally biased into a position to prevent said inertial weight means from effecting release of said gas, said pin means being operatively connected to said elastic strap means so that deployment of said elastic strap means arms said pneumatic means.

16. A system as in claim 14 wherein said pneumatic pressure means comprises an inertial weight means and a gas storage means, said inertial weight means adapted to effect the release of gas from said gas storage means upon severe deceleration of said vehicle to inflate said balloon, a safety pin means normally biased into a position to prevent said inertial weight means from effecting release of said gas, said pin means being operatively connected to said elastic strap means so that deployment of said elastic strap means repositions said pin means and arms said pneumatic means.

17. In combination with a vehicle having at least a front seat, a roof with accompanying upper structure and floor, a system for perventing injuries to the occupants of said vehicle, said system comprising an inflatable balloon pack, a balloon support means attachable to at least two points on said vehicle for positioning said balloon pack on the chest of an occupant of said vehicle, a pneumatic pressure means mounted on said vehicle for inflating said balloon upon severe deceleration of said vehicle once armed, and an inflating hose connecting said pneumatic pressure means with said balloon, said pneumatic pressure means being armed by placing said balloon support means across the chest of said occupant.

18. A combination as in claim 17 wherein said balloon support means comprises an elastic strap at least one end of which is secured to the upper structure of said vehicle.

19. A combination as in claim 17 wherein said balloon support means comprises a nonelastic shoulder harness, one end of which is attached to the upper structure of said vehicle and the other end of which is adapted to be connected to a lap belt.

20. A combination as in claim 17 wherein said inflatable hose is normally flattened.

21. In combination with a seat, a system for preventing injuries to the occupants of an aircraft, said system including an inflatable balloon pack, an air valve whose operativeness is controlled by a plug, an inflating hose operatively connecting said balloon pack with said air valve, an elastic cord extending from said balloon pack, a keyed plug on the end of said elastic cord adapted to be inserted into said air valve to actuate same, pressure source means connected to said air valve, and means on said seat to mount said system so that when said system is utilized and said plug is inserted into said air valve, the balloon pack is mounted across the chest of the user.

22. The system of claim 21 wherein said system mounting means are located in the seat and the valve is located in the arm rest.

23. The system of claim 21 where said inflating hose is normally in a flattened state.

24. The system of claim 21 wherein said system mounting means are located in the seat and the valve is located in the seat.

25. A system for preventing injury to an occupant or occupants of a vehicle upon severe deceleration thereof, said system consisting of a pneumatic pressure release unit and an inflatable balloon pack, said pneumatic pressure means being adapted to inflate said balloon upon severe deceleration of said vehicle; said pneumatic pressure release unit being actuated by a passive inertial weight free to slide against a calibrated opposing spring, said inertial weight being free to puncture the diaphragm seal of a pressure storage container when the resistance of said spring is overcome; and mechanical interference means comprising a slidable obstruction; said obstruction being controllable by external means to prevent any motion of the inertial weight from its initial position.

* * * * *